H. H. MAPELSDEN.
RECORDING MECHANISM.
APPLICATION FILED MAR. 24, 1919.
1,347,787.
Patented July 27, 1920.
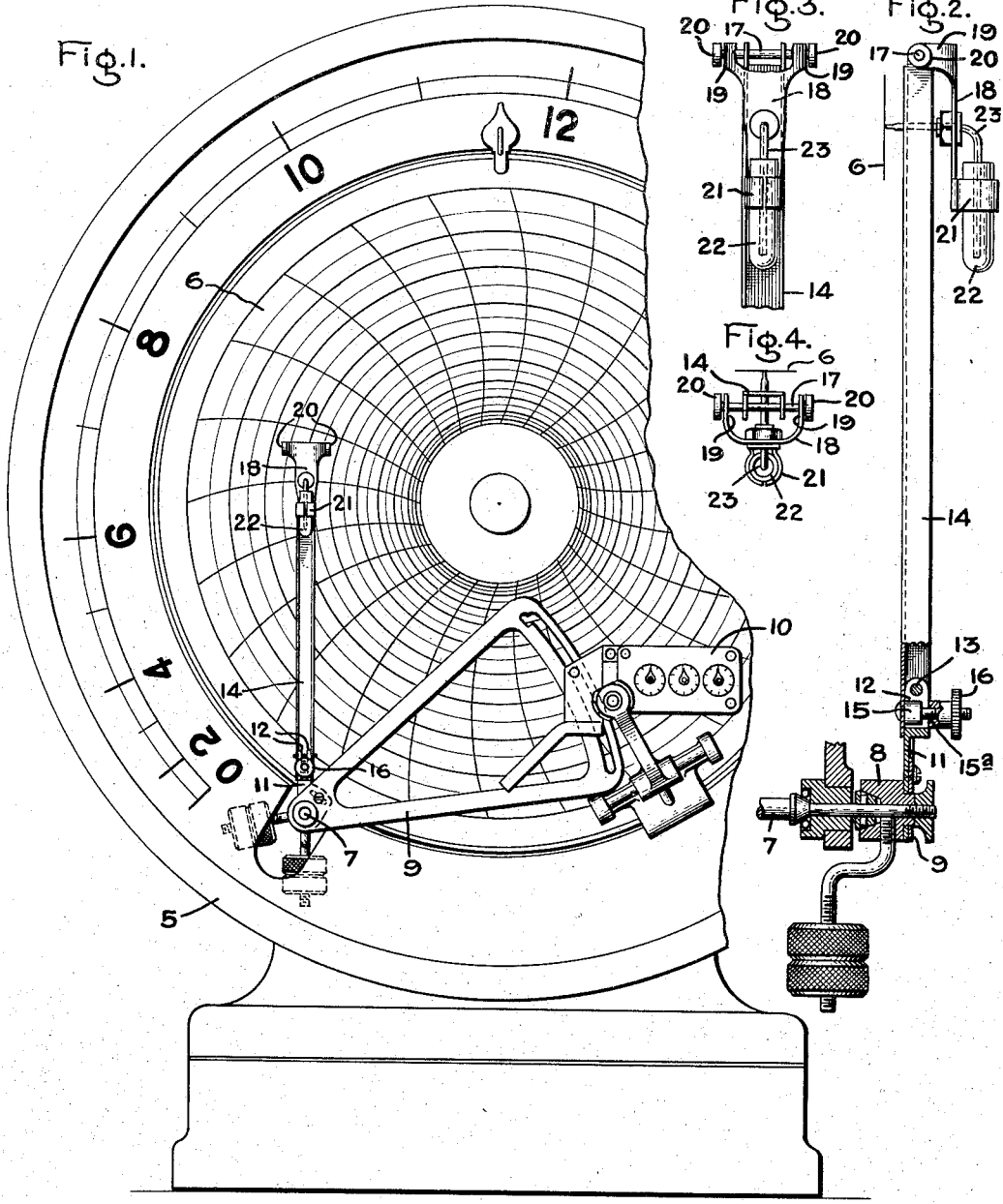
Inventor:
Harold H. Mapelsden,
by Albert G. Davis
His Attorney.

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

RECORDING MECHANISM.

1,347,787.　　　　　　　Specification of Letters Patent.　　Patented July 27, 1920.

Application filed March 24, 1919. Serial No. 284,658.

*To all whom it may concern:*

Be it known that I, HAROLD H. MAPELSDEN, a citizen of the United States, residing at Schenectady, in the county of Schenectady, State of New York, have invented certain new and useful Improvements in Recording Mechanism, of which the following is a specification.

The present invention relates to recording mechanism wherein a pen engages a moving chart for the purpose of making a continuous record thereon, and has for its object to provide an improved structure and arrangement of pen and pen arm, the advantages of which are pointed out hereinafter.

For a consideration of what I believe to be novel and my invention, attention is directed to the accompanying description and the claims appended thereto.

In the drawing, Figure 1 is a face view of an instrument with my improved pen mechanism mounted thereon; Fig. 2 is a side view of the pen and pen arm; Fig. 3 is a face view of the pen and the upper end of the pen arm, and Fig. 4 is a top plan view thereof.

Referring to the drawing, 5 indicates an instrument, here shown as a flow meter, having a revolving chart 6 upon which it is desired to make a continuous record, and 7 indicates a shaft which is turned in response to changes in value of that which is being measured, for example, the flow of a fluid. Fixed on the outer end of shaft 7 is a hub 8 (Fig. 2) which carries a cam plate 9 for moving an integrating device 10. It will be understood that the flow meter shown is one of known design and arrangement, and that it is illustrated only by way of example. It forms no part of my present invention.

Now according to my invention I provide on hub 8 a short bracket 11 having a pair of ears 12 in the ends of which is a spindle 13 on which is pivoted a pen arm 14. Pen arm 14 is channel shaped, ears 12 fitting within the channel, and it extends down below spindle 13 to the base of ears 12. Carried by the inner end of pen arm 14 below spindle 13 is a stud 15 which is guided between ears 12. Projecting from stud 15 is a threaded pin 15ª, on which is a nut 16 having a knurled head. When nut 16 is turned down against ears 12, it holds the pen arm 14 in an upright position, clamping the inner end of pen arm 14 against bracket 11. At the outer end of pen arm 14 is a spindle 17 on which is pivoted a pen holder comprising a flat plate 18 having at its outer end a pair of parallel ears 19 provided with holes through which spindle 17 passes. Ears 19 are turned at a right angle to the plane of plate 18 and are held on spindle 17 by knobs 20 fixed on the ends of spindle 17. The part 18 of the pen holder thus extends along the side of arm 14 and can swing toward and away from it. At the inner end of part 18 is a pair of clips 21 which hold an ink well 22 and just above the upper end of well 22 is a capillary tube 23 which forms a pen. One end of tube 23 dips down into the ink well while the other end is turned at about a right angle and passes through a hole in pen arm 14 to a position where it may engage chart 6. The end of tube 23 which engages chart 6 is drawn down to a fine point as shown in Fig. 2 so as to make a fine line on the chart. Since spindle 17 is to one side of the plane of plate 18 it will be clear that the pen holder tends to swing to a position where its lower end rests against arm 14 and as a result when the parts are in the position shown in Fig. 2, the pen 23 rests against chart 6 by gravity. Pen holder 18 and ink well 22 overbalances pen arm 14 giving it a tendency to fall away from chart 6 but normally the pen arm is clamped in vertical position by nut 16 as pointed out above.

With the above described arrangement it will be seen that the pen 23 normally rests against the chart 6 by gravity and is free to follow any irregularities in the chart surface. The pen arm 14, however, has a normal tendency to fall away from the chart 6 by gravity and as a result when it is desired to change the chart it is only necessary to unscrew nut 16 when the pen arm will turn on spindle 13, the upper end falling away from chart 6. The amount of this movement will depend on the amount which nut 16 is screwed back for such nut always acts as a stop to limit the movement. After the chart has been changed the pen is brought back to operative position by screwing up nut 16 which of course pulls the pen arm 14 back to vertical position. This makes the removal of the pen from the chart and its return thereto a very simple matter and the pen will always come back into proper engagement with the chart and bear on it with the desired degree of pressure without any especial care on the part of the attendant. Furthermore, no nice adjustments are necessary to insure the proper functioning of the various parts.

In accordance with the provisions of the patent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is:—

1. In an apparatus of the character described, a chart, a pen arm pivoted at one end in a plane parallel to the chart, whereby it is adapted to swing on said pivot to move the other end toward and away from the chart, a pen pivotally mounted at the other end of the pen arm and adapted to rest against the chart by gravity, said pen arm tending normally to fall away from the chart, and means for holding the pen arm in proximity to the chart.

2. In an apparatus of the character described, a chart, a pen arm which extends substantially parallel to the chart and is pivoted at one end adjacent the chart, said pen arm being adapted to turn on such pivot to move the other end away from and toward the chart, means for holding the pen arm with its free end adjacent the chart, and a pen holder pivoted on such free end and carrying a pen adapted to rest by gravity against said chart.

3. In an apparatus of the character described, a chart, a pen arm which extends substantially parallel to the chart and is pivoted at one end adjacent the chart, said pen arm being adapted to turn on such pivot to move the other end away from and toward the chart, means for holding the pen arm with its free end adjacent the chart, and a pen holder pivoted on such free end and carrying a pen adapted to rest by gravity against said chart.

4. In an apparatus of the character described, a chart, a pen arm which extends substantially parallel to the chart and is pivoted at one end adjacent the chart, said pen arm being adapted to turn on such pivot to move the other end away from and toward the chart, a pin projecting from the pen arm adjacent its pivot, a nut on the end of said pin, and a fixed abutment against which the nut screws whereby it may move the pen arm on its pivot, said pen arm being biased to turn on its pivot to move the second mentioned end of the pen arm away from the chart.

5. In an apparatus of the character described, a chart, a pen arm which extends substantially parallel to the chart and is pivoted at one end in a plane parallel to the chart, said pen arm being adapted to turn on said pivot to move its other end toward and away from the chart, a pen holder pivoted on the other end of said pen arm and hanging alongside the pen arm, and a pen carried by the pen holder and adapted to rest by gravity against the chart.

6. In an apparatus of the character described, a chart, a pen arm which extends substantially parallel to the chart and is pivoted at one end in a plane parallel to the chart, said pen arm being adapted to turn on said pivot to move its other end toward and away from the chart, a pen holder pivoted on the other end of said pen arm and hanging alongside the pen arm, an ink well carried by the pen holder, and a pen also carried by the pen holder comprising a capillary tube, one end of which dips into the ink well and the other end of which rests against the chart.

7. In an apparatus of the character described, a chart, a pen arm which extends substantially parallel to the chart and is pivoted at one end in a plane parallel to the chart, said pen arm being adapted to turn on said pivot to move its other end toward and away from the chart, a pen holder pivoted on the other end of said pen arm and hanging alongside the pen arm on the side of it remote from the chart, an ink well carried by the pen holder, and a pen, one end of which dips in the ink well and the other end of which rests against the chart.

8. In an apparatus of the character described, a chart, a pen arm which extends substantially parallel to the chart and is pivoted at one end in a plane parallel to the chart, said pen arm being adapted to turn on said pivot to move its other end toward and away from the chart, a pen holder pivoted on the other end of said pen arm and hanging alongside the pen arm, on the side of it remote from the chart, an ink well carried by the pen holder and a pen comprising a capillary tube having one end projecting into the ink well and the other end turned at an angle and projecting beyond the pen arm into engagement with the chart.

In witness whereof, I have hereunto set my hand this 22nd day of March, 1919.

HAROLD H. MAPELSDEN.